Patented June 14, 1949

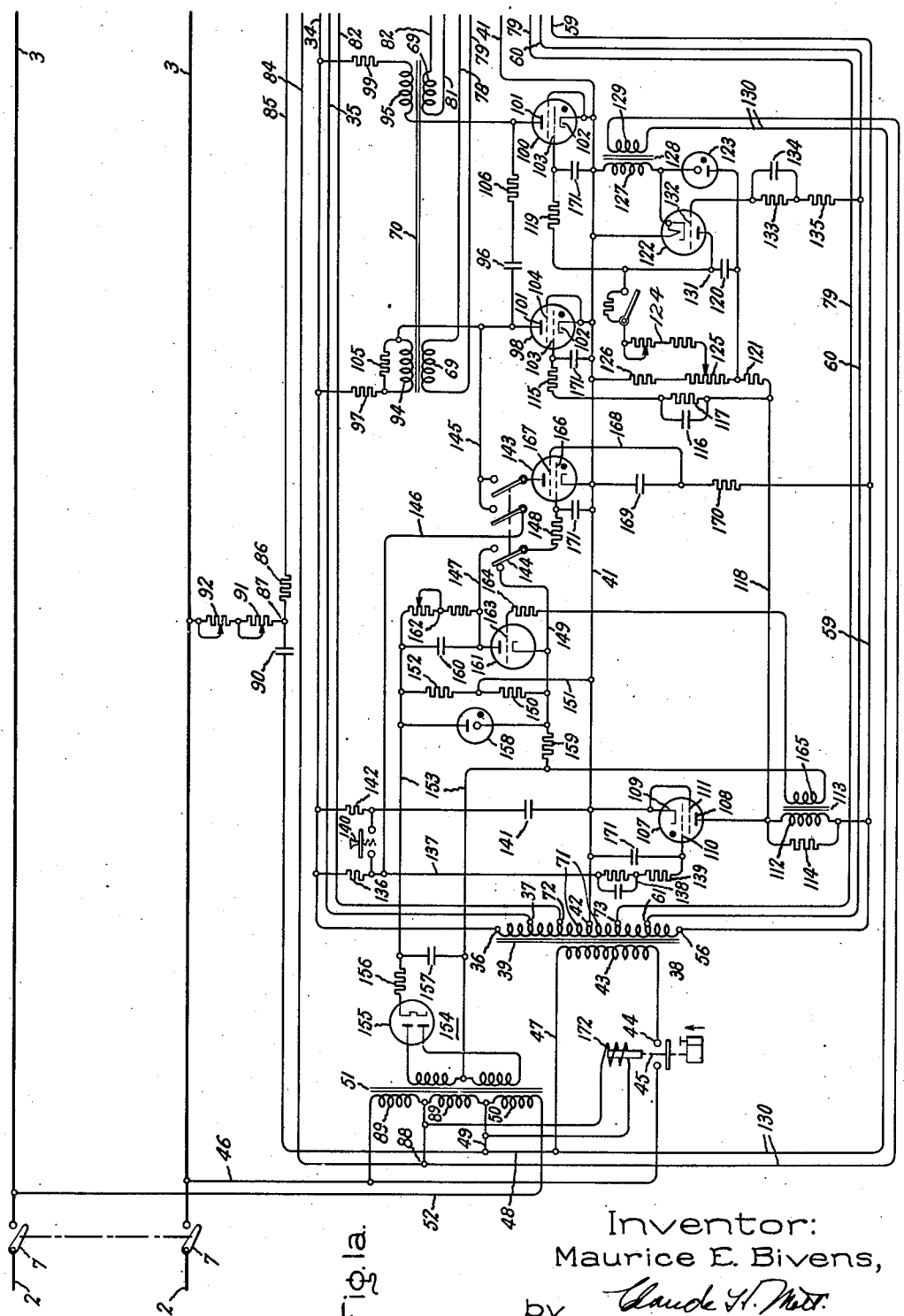

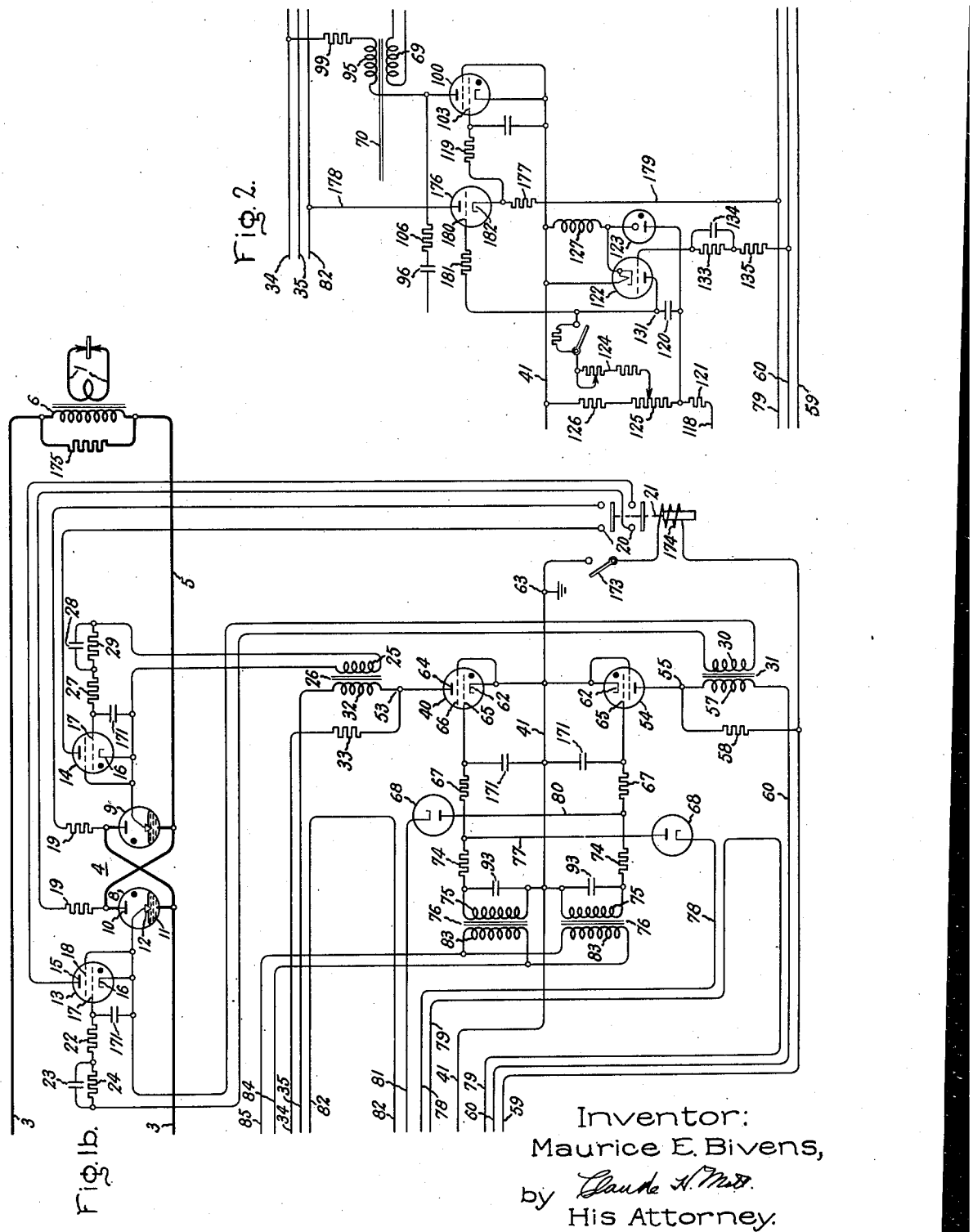

2,473,238

UNITED STATES PATENT OFFICE 2,473,238

ELECTRIC VALVE CONTROL CIRCUITS

Maurice E. Bivens, Schenectady, N. Y., assignor to General Electric Company, a corporation of New York Application April 19, 1947, Serial No. 742,754

20 Claims. (Cl. 315—246)

My invention relates to electric valve control circuits and more particularly to new and improved electric valve control circuits for electric translating apparatus which effect intermittent energization of a load circuit and which not only control accurately the period of each energization of the load circuit but also control accurately the interval of time between successive energizations of the load circuit.

In the field of resistance welding, electric valve control circuits have been used, not only to control the timed applications of welding current, but also to control the magnitude of the welding current by the phase shift method in order to obtain the desired heating effect of the welding current on the work parts. Also in order to prevent saturation of the welding transformer such electric valve control circuits have been used to obtain synchronous starting of welding current flow, that is, initiation of current flow at the same point of the voltage wave of the source, as well as to obtain current flow in full cycle steps. As will be pointed out in greater detail below, I provide an improved alternating current electric valve system which, when used as a resistance welding control, operates synchronously to time in full cycle steps the flow of welding current which is adjustable in magnitude by the phase shift method and which also operates to time in full cycle steps the interval of time between successive energizations of the welding circuit.

When sine wave control voltages are applied to the control elements of a pair of electric valves connected in reverse parallel relationship for transmitting alternating current to a load device, it is not always possible to obtain balanced conduction through the valves because of variations in the critical control voltage characteristics of these electric valves as well as due to the differences in cathode voltages resulting from the differences in their connections with the supply circuit. Thus, for example, in a resistance welding circuit one of the cathodes of the pair of electric valves is tied to one terminal of the source of supply, whereas the other terminal is tied to one of the terminals of the welding transformer and is consequently subjected to abrupt voltage variations at the time the valve becomes non-conducting. By increasing the magnitude of the sine wave control voltage, its wave front may be made sufficiently steep to reduce to a low value variations in the firing times of such valves but this is productive of other operating difficulties and also increases the size and cost of the control equipment employed.

Furthermore, in such electric valve circuits where timing functions depend on the charge and discharge of a timing capacitor it is often necessary to increase the size of the capacitor so that its discharge time may be suitably lengthened without increasing the resistance of its discharge circuit to so high a value that leakage discharge currents seriously interfere with the accurate timing operation desired. Furthermore, when using a hot cathode rectifier the self-generating voltage of the rectifier may produce a charge on the capacitor which will give a false or inaccurate timing operation to the system of which it forms a part.

Also in such electric valve control circuits the maximum speed of its operation is often dependent on the operating times of certain electromechanical switches and for this reason it is desirable to provide a system in which time-on and time-off operations are accurately determined solely by electronic means having no moving parts. This desirable high speed operation of a system also makes it necessary to charge the timing capacitor or capacitors at a high rate which of necessity requires a special charging circuit other than the grid-to-cathode circuit of one of the electric valves which, at the same time, may serve another function in the control circuit.

It is an object of my invention to provide an electric valve control circuit in which relay electric valves of low current carrying capacity, and consequently having less variations in their critical control voltage characteristics, are employed in circuits where their cathodes are not subjected to abrupt voltage changes for producing abrupt or steep wave front control voltages which are applied to electric valves connected in a power circuit and subjected to unbalance firing for reasons indicated above.

It is also an object of my invention to provide an electric valve control circuit in which a timing capacitor of large capacity is quickly charged through a hot cathode rectifier connected in circuit therewith and a source of voltage which opposes the self-generated voltage of the rectifier and establishes the voltage of one terminal of the capacitor relative to another part of the circuit to which the control voltage of the capacitor is applied so that infallible operation of the system will always occur.

It is another object of my invention to provide for high speed operation of an electric valve control system by embodying therein an improved electronic timing circuit which effects the intermittent energization of a load circuit and not only controls the period of each energization thereof but also controls the interval of time between successive energizations of the load circuit without requiring the use of electro-mechanical relays which by reason of their comparative slow operating characteristics limit the maximum speed of operation of any system of which they form a part.

It is also an object of my invention to provide a new and improved electric valve control system particularly suited for use in the resistance welding field.

Further objects of my invention will become apparent from a consideration of the following description of the embodiments thereof shown in the accompanying drawings. Figs. 1a and 1b of these drawings, when assembled with the broken circuits along the margins thereof connected in accordance with corresponding reference numerals applied thereto, is a diagrammatic representation of one embodiment of my invention as applied to a resistance spot and line welding control, and Fig. 2 is a diagrammatic representation of a portion of the circuit of Fig. 1a illustrating the use of a cathode follower circuit to prevent negative grid current flow through one of the gaseous electric valves of the system rendering uneven the scale indications for equal timing adjustments of the discharge circuit of said capacitor.

In accordance with the illustrative embodiment of my invention, a pair of electric valves reversely connected in parallel with one another control the flow of alternating welding current from an alternating current supply circuit to the primary winding of a welding transformer having its secondary winding connected to a pair of cooperating resistance welding electrodes. These power line valves are controlled by reversing the phase of an alternating control voltage applied to the control elements of their firing valves by means of relay valves which are rendered conducting and non-conducting by the application of sine wave voltages of the supply circuit to the control elements of these relay valves. These sine wave voltages are selectively and automatically impressed on the control elements of the relay valves so that the more negative voltage is at all times controlling. The point in the positive half cycle of anode voltage at which the relay valves become conductive is determined by a sine wave voltage of a phase shift circuit, which voltage is normally ineffective by reason of a sine wave bias voltage and becomes effective when the bias voltage is neutralized or overcome by a sine wave turn-on voltage derived from an oscillating circuit.

This oscillating circuit is energized from the supply circuit when a turn-on valve becomes conducting and disappears when a timing valve becomes conducting a predetermined time later. Both the turn-on and timing valves are controlled by applying to their control elements the lagging voltage drop across a keying valve which is connected through an inductive circuit with the supply circuit so that a positive half cycle of anode voltage is applied to the keying valve during one half cycle of the source and during the next half cycle of the source a positive anode voltage is applied to the anodes of the turn-on and timing valves. The timing valve operates after a time delay determined by a capacitor which is continuously discharged through a discharge circuit and which is charged from the supply circuit through a hot cathode rectifier to a predetermined voltage while the keying valve is non-conducting. The self-generating voltage of this rectifier is overcome by a source of voltage which also determines the potential of the control element connection thereof with the timing valve relative to the cathode of this valve.

The keying valve is rendered conductive in like trailing fashion by an initiating valve connected in parallel with the turn-on valve. Once conduction is initiated by the keying valve, it and the turn-on valve conduct alternately since the control element of the keying valve is also connected to be responsive to the lagging voltage drop across the turn-on valve. This mutual trailing operation of the keying and turn-on valve is interrupted when the timing valve by its conduction renders the oscillating circuit non-oscillatory and reduces the inductance thereof in circuit with the turn-on valve to zero or a low value so that the trailing voltage drop across the turn-on valve disappears and the keying valve cannot again become conductive.

The initiating electric valve has two control elements, one of which is connected to apply a starting potential thereto at the beginning of a positive half cycle of its anode voltage providing its other control element will permit it to conduct. The other control element is connected to be responsive to the charge on a timing capacitor having a continuously effective discharge circuit which is adjustable for various times. This capacitor is charged from a direct current supply circuit through a controlled rectifier which becomes conductive in response to potentials applied to its control element whenever the keying valve is conducting.

The circuit thus described times the current-on periods and the time-off periods between successive time-on periods. By operating a switch, the initiating valve and its timing circuit may be rendered inactive so that the operation of another switch will cause the remainder of the circuit to time one current-on period as against the continued succession of time-on and time-off periods produced when the first-mentioned switch is closed.

My invention will be better understood from the following detailed description of the embodiment thereof diagrammatically illustrated in Figs. 1a and 1b combined.

As shown in these figures, the load or welding circuit 1 is energized from a source of alternating current 2 through a supply circuit 3 and electric translating apparatus, comprising electric valve means 4, a conductor 5 and a welding transformer 6. The supply circuit 3 is connected with the source of supply 2 through manually operable switches 7. Although I have referred to the welding circuit or load circuit as being that portion of the circuit connecting the secondary winding of the welding transformer to the welding electrodes, it is obvious that this load circuit may be as readily considered as also including the welding transformer 6 and its connected conductor 5.

Electric valve means 4 may comprise, as illustrated, a pair of electric power valves 8 and 9 which are reversely connected in parallel to supply alternating current from the supply circuit 3 to the load circuit. The electric valves may be of any of the types well known in the art, but as illustrated each comprises an anode 10, a mercury pool cathode 11, and an immersion igniter type control element 12. The igniter elements 12 may be formed of a high resistance material and are arranged in the electric valves so that their tips are immersed in the mercury cathode pools of these valves. The elements of each of these electric valves are enclosed in an envelope which preferably contains, as indicated by the dot, an ionizable medium such as a gas or a vapor.

Electric valves 8 and 9 are provided with control or firing electric valves 13 and 14. Each of these firing valves is provided with an anode 15, a cathode 16, a control element 17, and a shield grid 18 which is directly connected electrically with its cathode. The elements of each of these firing valves are also enclosed in an envelope which preferably contains, as indicated by the dot, an ionizable medium such as a gas or a vapor.

The anode-cathode circuit of each of these firing valves 13 and 14 is connected in series with a current limiting resistor 19 and the contacts 20 of a relay 21 between the igniter 12 and the anode 10 of its associated electric valve 8 or 9. The arrangement is such that when a positive anode potential is applied to either of the electric valves 8 and 9, the same positive anode potential is applied to the firing valves 13 and 14. These valves are rendered conductive by the application of proper control potentials to their control elements 17 and when conducting connect the control elements 12 of the electric valves 8 and 9 to their anodes in order to initiate conduction through these electric valves during positive half cycles of anode voltage. Thus, the point in the half cycle of positive anode voltage at which electric valves 8 and 9 become conductive depends on the point in the same positive half cycle of anode voltage at which electric valves 13 and 14 become conductive, and this in turn depends on the control potentials applied to the control elements 17 of these electric valves.

The control element 17 of electric valve 13 is connected with its cathode 16 through a control element circuit completed through a current limiting resistor 22, a negative self-biasing means comprising a parallel connected capacitor 23 and resistor 24, and a secondary winding 30 of a control transformer 31. In like manner the control element 17 of electric valve 14 is connected to its cathode 16 through a current limiting resistor 27, a negative self-biasing means comprising a parallel connected capacitor 28 and resistor 29, and the secondary winding 25 of a control transformer 26. Primary winding 32 of control transformer 26 is permanently connected through a resistor 33 and conductors 34 and 35 to terminals 36 and 37 of the secondary winding 38 of a transformer 39. It may also be connected through a relay electric valve 40 and conductors 35 and 41 across terminals 37 and 42 of the secondary winding 38 of transformer 39. One terminal of the primary winding 43 of transformer 39 is connected through contacts 44 of a relay 45 and a conductor 46 to one of the supply conductors 3 and the other terminal of this winding is connected through conductors 47, 48 and 49, a winding section 50 of a transformer 51, and a conductor 52 to the other conductor of the supply circuit 3. Thus, each time electric valve 40 is rendered conducting or non-conducting the phase of the voltage of supply circuit 3 applied to the primary winding 32 of control transformer 26 is reversed. The arrangement is such that when positive anode potential is applied to firing valve 14 and electric valve 40 is non-conducting the alternating current voltage applied by control transformer 26 by means of the secondary winding 25 connected in the control circuit of electric valve 14 is such as to render electric valve 14 non-conducting. On the other hand, when electric valve 40 becomes conducting, the connection of the primary winding 32 of control transformer 26 is reversed so that the phase of the voltage applied to the control element 17 of electric valve 14 by the secondary 25 thereof is such as to render electric valve 14 conducting. When this occurs, the voltage applied to the control element 17 of electric valve 14 abruptly changes from some negative value to some positive value, thus providing a steep wave front voltage which immediately causes electric valve 14 and its controlled electric valve 9 to become conductive at the same point in the voltage wave, irrespective of variations in the negative grid characteristics of these electric valves 14 and 9. The abrupt change in potential applied to the control element 17 of electric valve 14 at the time electric valve 40 becomes conducting is of particular importance in that the cathode connection of electric valve 14 is tied to one terminal of the primary winding of welding transformer 6 and thus during operation is subjected to abrupt voltage changes which would result in unbalancing firing of the electric valves 8 and 9 if this steep wave front control voltage were not provided.

In the same manner that the conductivity of electric valve 40 swings the primary terminal 53 of control transformer 26 from terminal 36 to terminal 42 of the secondary 38 of transformer 39, another relay electric valve 54 swings the primary terminal 55 of control transformer 31 from secondary terminal 56 of transformer 39 to terminal 42 thereof. Terminal 55 of the primary winding 57 of transformer 31 is connected through a resistor 58 and a conductor 59 to secondary terminal 56 of transformer 39 and the other terminal of the primary winding 57 is connected through a conductor 60 to secondary terminal 61 of transformer 39. In each case resistors 33 and 58 not only complete the permanent connection of the primary windings of the control transformers 26 and 31 across terminals 36, 37 and 56, 61 of transformer 39, but also serve as load current limiting means in order to prevent conduction of electric valves 40 and 54 from short circuiting portions of the secondary winding 38 of transformer 39 through terminals 36, 42 and 56, 42 thereof.

When electric valve 54 becomes conducting, the negative alternating bias voltage of winding 30 of transformer 31 abruptly changes to a positive value rendering electric valve 13 conducting at a time when its anode voltage is positive. Conduction through electric valve 13 renders its controlled electric valve 8 conductive to supply alternating current from the supply circuit 3 to the load circuit 5, 6, 1.

Relay electric valves 40 and 54 have their cathodes 62 tied directly to conductor 41 which, as illustrated, is connected to ground at 63. Consequently, these relay electric valves will have no disturbance in their cathode potentials due to changes in conductivity of parts of the circuit to which they are connected. It is, therefore, possible to control these electric valves with alternating current sine wave voltages of low potential and consequently moderately steep wave front and still obtain balanced firing of these electric valves. The fact that these relay valves 40 and 54 are of low capacity also aids in this respect, since their critical control characteristics will vary very little and for all practical purposes may be considered uniform.

Each of the relay electric valves 40 and 54, in addition to its cathode 62, is provided with an anode 64, a control element 65 and shield grid 66 which is directly connected electrically with its cathode 62. These elements of each of these valves are enclosed in an envelope which preferably contains, as indicated by the dot, an ionizable medium such as a gas or a vapor.

The control element 65 of each of the relay electric valves 40 and 54 is connected with its cathode 62 through a control element circuit which selectively and automatically impresses on control element 65 portions of a sine wave bias voltage or an adjustable phase sine wave control voltage in accordance with which is the more negative. Means is also connected in circuit with the bias voltage for rendering this bias voltage ineffective for full half cycles of the voltage of the supply circuit so that the electric valves 40 and 54 may be rendered conducting in response to the phase adjustable sine wave control voltage which determines the instant in each of the positive half cycles of anode voltage that these electric valves become conductive. This portion of the circuit has been described and claimed in my copending application, Serial No. 685,330, for Electric valve control circuit, filed July 22, 1946, and assigned to the assignee of this application.

As illustrated in the drawing the control element circuit for each of the electric valves 40 and 54 branches into two parallel connected portions after passing through a current limiting resistor 67. One of the parallel portions includes in series with one another a unidirectional current conducting device 68, a secondary 69 of a transformer 70, and one of the winding portions 71 of the secondary 38 of transformer 39 between terminals 72, 42 and 73. The other parallel portion includes in series with one another a resistor 74 and a secondary 75 of a transformer 76. The control circuit for electric valve 40 is completed through unidirectional current conducting device 68 as follows: Conductor 77, device 68, conductor 78, winding 69, conductor 79, terminals 73 and 42 of winding 38 and conductor 41. The control circuit for electric valve 54 is completed through the other unidirectional conducting device as follows: Conductor 80, device 68, conductor 81, winding 69, conductor 82, terminals 72 and 42 of winding 38 and conductor 41.

The unidirectional conducting device 68 polarizes the branch in which it is connected so that current may flow from the non-polarized branch through resistor 74 thereof, which will have a voltage drop corresponding to the difference in voltage of the secondary windings connected in these branch circuits when the resultant voltage is in a direction to cause the unidirectional current conducting device to conduct. The unidirectional current conducting device selectively and automatically impresses on the control element of the electric valves 40 and 54 with which it is associated, the voltage of that branch of the control element circuit which is more negative. These unidirectional current conducting devices 68 may be electric discharge devices of the vacuum type having their anodes connected toward the control elements 65 of electric valves 40 and 54 and between resistors 67 and 74 in the control element circuits of these valves.

The secondary windings 75 of transformers 76 impress on control elements 65 of electric valves 40 and 54 sine wave voltages of the same frequency as the supply circuit and adjustable in phase relation with regard to the anode-cathode voltages of these electric valves. As will appear below, these adjustable phase sine wave voltages determine the instant in the half cycles of positive anode voltage that conduction is initiated by electric valves 40 and 54 and consequently when the load circuit electric valves 9 and 0 become conductive. They, therefore, consequently determine the amount of current transmitted to the welding transformer and the work connected in the load circuit.

This heat control is obtained by connecting the primary windings 83 of transformers 76 in parallel with one another, and through conductors 84 and 85 in series with a resistor 86 across the output terminals 87 and 88 of a static phase shift network comprising winding sections 89 of the primary of transformer 51 which are connected in series with one another and as a unit in parallel with a series circuit through capacitor 90 and resistors 91 and 92 across supply conductors 3, through conductors 46, 49, winding section 50 of transformer 51 and conductor 52. Both resistors 91 and 92 are adjustable, one resistor being adjusted for providing full heat, that is, adjusting the control voltages of windings 75 to render electric valves 40 and 54 conducting at the power factor phase angle of the load and the other being adjustable to decrease the heat by causing the phase control voltage to fire electric valves 40 and 54 at an adjustable time later in the cycle than the power factor phase angle of the load current. A capacitor 93 may be connected across the primary windings 75 of transformers 76 to increase the impedance of the primary circuits of these transformers and compensate for the exciting current supplied by the phase shift network thereto. This prevents the normally semicircular locus of the control voltage victor from being pulled in toward its point of rotation determined by tap 88 of the winding sections 89. The resistor 86 provides means for reducing the effect of line voltage disturbances on the phase controlled voltages supplied by transformers 76.

The winding sections 71 of the secondary 38 of transformer 39 impress in the control element circuits of electric valves 40 and 54 negative sine wave bias voltages of the same frequency as the supply circuit which is connected through transformer 39 to the anode-cathode circuits of these electric valves. That is, the voltages of these secondary winding sections are in phase opposition to the anode-cathode voltages of these valves. The negative bias voltage of winding sections 71 of transformer 39 is rendered ineffective by opposing thereto a turn-on voltage of substantially sine wave form which is of greater magnitude than the negative bias voltage. This turn-on voltage is provided by the secondary windings 69 of transformer 70 and is of the same frequency as that of supply circuit 3. This turn-on voltage is obtained from an oscillating closed circuit including primary windings 94 and 95 of transformer 70 and a tuning capacitor 96.

Primary winding 94 of transformer 70 is connected across terminals 36 and 42 of the primary 38 of transformer 39, through conductor 34, current limiting resistor 97, the anode-cathode circuit of a turn-on electric valve 98 and conductor 41. Primary winding 95 of transformer 70 is connected in like manner across terminals 36 and 42 of the secondary 38 of the transformer 39 through conductor 34, resistor 99, the anode-cathode circuit of a timing electric valve 100, and conductor 41. Electric valves 98 and 100 each comprise an anode 101, a cathode 102, a control element 103 and a shield grid 104 which is directly connected electrically with its cathode 102. These elements are also enclosed within an envelope which, as indicated by the dot, preferably contains an ionizable medium such as gas or a vapor.

When electric valve 98 is conducting, the primary windings 94 and 95 of transformer 70 are connected in series with one another for additive polarity and when both electric valves 98 and 100 are conducting these primary windings are connected in parallel with one another for opposite polarity. When both electric valves 98 and 100 are conducting, windings 94 and 95 by opposing one another reduce the impedance of their circuits to zero or a very low value and consequently at that time, the current through these valves is limited primarily by the resistors 97 and 99 connected in circuit therewith. A resistor 105 connected across the primary winding 94 is provided to increase the current flow through electric valve 98 and thereby maintain its ionization and conduction until the current flow passes through zero even though its control element 103 becomes negative relative to its cathode before its current flow passes through zero.

As will appear below, electric valve 98 is first rendered conducting and, at a predetermined time later, electric valve 100 is rendered conducting. As it is desired to have both of these electric valves conducting at the same time, a resistor 106 connected in series circuit with capacitor 96 across the anodes 101 of electric valves 98 and 100 serves to prevent conduction of electric valve 100 from extinguishing electric valve 98 by impressing a negative voltage on its anode.

With the arrangement described, the oscillating circuit including primary windings 94 and 95 of transformer 70 in close circuit with capacitor 96 is set in oscillation and energized for half cycles of voltage so long as only electric valve 98 conducts. When electric valves 98 and 100 are conducting simultaneously capacitor 96 is short circuited and the primary windings 94 and 95 of transformer 70 are connected in parallel with one another for opposing polarity so that the circuit abruptly stops oscillating and no voltage is induced in the secondary winding 69 of transformer 70. Thus, secondary windings 69 impress in the control element circuits of electric valves 40 and 54 full cycles of alternating current which is substantially sinusoidal in shape, of the same frequency as the supply circuit and of greater magnitude than the sine wave bias voltage impressed in these control circuits by the secondary winding sections 71 of transformer 38.

To obtain full cycles of alternate current in the oscillating circuit just described, it is desirable to have turn-on electric valve 98 start conducting at the beginning of the half cycle of its positive anode voltage and to have timing electric valve 100 start conducting at the beginning of a half cycle of its positive anode voltage, a pre-adjustable time later. This is accomplished by making these valves conducting in trailing fashion in response to the conduction of a keying electric valve 107.

Electric valve 107 comprises an anode 108, a cathode 109, a control grid 110, and a shield grid 111 which is directly connected electrically with its cathode 109. These elements are enclosed in an envelope which, as indicated by the dot, preferably contains an ionizable medium such as a gas or vapor. The anode-cathode circuit of this electric valve is connected in series with an inductive load comprising the primary winding 112 of a control transformer 113 and the parallel connected resistor 114 across the terminals 42, 56 of the secondary 38 of transformer 39. It will be noted that the cathodes 102 of electric valves 98 and 100 and the cathode 109 of electric valve 107 are directly connected together and to terminal 42 of the secondary 38 of transformer 39. It will also be noted that the anodes 101 of electric valves 98 and 100 are connected to the potential of terminal 36 of winding 38 of transformer 39 whereas the anode 108 of electric valve 107 is connected to terminal 56 of this primary winding 38. Thus, electric valves 98 and 100 may become conducting during a half cycle of supply circuit 3 when their anodes are positive and electric circuit 107 may become conducting during the next half cycle of the supply circuit 3 when its anode becomes positive. Since, as will be pointed out below, conduction of electric valves 98 and 100 is dependent on electric valve 107 it may be stated that electric valves 98 and 100 conduct in trailing response to the conductivity of electric valve 107.

As previously noted, the cathodes of electric valves 98, 100, and 107 are directly connected together by conductor 41. Conduction of electric valve 98 is made dependent on conduction of electric valve 107 by connecting its control element 103 through current limiting resistor 115, a negative self-biasing means comprising parallel connected capacitor 116 and resistor 117 and conductor 118 to the anode connection of electric valve 107 with the inductive device 112, 114.

Electric valve 107 is a rectifier and passes current in one direction only, but due to its inductive load 112, 114, it continues to conduct over and into the next half cycle of supply voltage for about 15° thereof, while part of the stored energy in its inductive load is fed back to the supply circuit. Thus, when electric valve 107 is conducting, its anode voltage drop causes electric valve 98 to trail in conduction during the negative half cycle of electric valve 107 which corresponds to the next positive half cycle of anode voltage for electric valve 98. The control potential thus obtained for electric valve 98 has a substantially rectangular wave form and is of practically constant magnitude as limited by the drop across electric valve 107. This voltage drop will usually be about 15 volts for gas valves of the type usually used. It will be noted that when electric valve 107 is nonconducting, the voltage across it is in phase opposition to the anode-cathode voltage of electric valve 98 and that this voltage applied in the control circuit of electric valve 98 holds it nonconducting.

The conductivity of electric valve 100 is also made dependent on the conductivity of electric valve 107 by connecting their cathodes together through conductor 41 and by connecting the control element 103 of electric valve 100 to the anode connection of electric valve 107 through a current limiting resistor 119, a timing capacitor 120, a resistor 121 and conductor 118. During the time that electric valve 107 does not conduct, capacitor 120 is charged through a hot cathode rectifier 122 which may be of the vacuum type and which is connected in circuit with the capacitor across a voltage regulating valve 123. This valve is connected in series with its voltage absorbing resistor 121 across the anode and cathode terminals of electric valve 107. Valve 123 may be as indicated, of the gaseous discharge type which, when conducting, maintains across its terminals a substantially constant voltage for different values of current flow therethrough. The particular valve employed is regulated to hold 105 volts across its terminals.

Electric valve 100 will not conduct therefore, even after electric valve 107 becomes conducting until the charge on capacitor 120 has decreased through its adjustable discharge circuit 124. This discharge circuit includes two fixed resistors and an adjustable resistor. As illustrated, one of the fixed resistors may be short circuited by a range switch in order to remove it from the discharge circuit.

The adjustable discharge circuit 124 for capacitor 120 is completed through the adjustable potentiometer 125 which is connected in series with a resistor 126 across the terminals of the voltage regulating valve 123. Since a voltage also appears across the voltage regulating valve in its reverse direction, resistor 126 and potentiometer 125 operate to force the voltage of capacitor 120 down at an accellerated rate during the negative half cycle of anode voltage of electric valve 107. The arrangement is such that timing electric valve 100 becomes conducting at the beginning of a positive half cycle that occurs a full number of cycles later than the time turn-on electric valve 98 starts conducting. The adjustable resistor in the discharge circuit 124 may be tapped to provide one cycle timing increments and with the proper adjustment of potentiometer 125 the full number of cycles will invariably be the same. This insures timing of the main or power valves for conduction in the full cycle steps. In each case, electric valves 98 and 100 trail keying electric valve 107 in response to the trailing component of control element voltage from its anode 103 which results from its conducting over into the negative half cycle which corresponds to the positive half cycle of electric valves 98 and 100.

The hot cathode rectifier 122 provided for charging capacitor 120 is used instead of the grid-cathode circuit of electric valve 100 in accordance with the disclosure in my above referred to application Serial No. 685,330, because for long timing intervals, it is necessary to use a larger capacitor and this capacitor must be charged quickly at a comparatively high current rate. The reason for using a larger capacitor is so that the resistance of the discharge circuit is not made so great that the discharge through stray circuits seriously affects its timing function.

Hot cathode rectifiers have, however, a self-generated voltage which will apply to a capacitor in circuit therewith, a charge which will interfere with its accurate timing which of course is dependent on the capacitor receiving only a predetermined charge. The circuit through the capacitor and rectifier to which this self-generated voltage is applied may be circuitous and indirect or may be completed by leakage between conductors connected in circuit with the rectifier and capacitor. In the arrangement illustrated, this self-generated voltage is neutralized or overcome by the voltage of the secondary 127 of the filament heating transformer 128 for rectifier 122.

The primary winding 129 of transformer 128 is connected through conductors 130 across the lower primary winding section 89 of transformer 51 so that the terminal of the secondary 127 of this transformer which is connected to the cathode of rectifier 122, is at a positive polarity relative to the cathode 102 of electric valve 100 when a positive anode potential is applied to rectifier 122. This polarity, if of sufficient magnitude, will not only neutralize the self generated voltage of rectifier 122 but will also positively determine the voltage of terminal 131 of capacitor 120, which is connected to the control element 103 of electric valve 100, relative to the cathode potential of this electric valve. Thus, the circuit arrangement provided will always insure that capacitor 120 can discharge to a value such that a positive firing potential may be applied to the control element 103 of electric valve 100 by the voltage drop across electric valve 107. This operation is insured by making the hot cathode rectifier 122 of the controlled type and connecting its control element 132 through a long time constant negative self-biasing means comprising parallel connected resistor 133 and capacitor 134, a resistor 135 and conductor 60 to terminal 61 of the secondary winding 38 of transformer 39 so that this rectifier becomes conducting only during the middle portion of its positive anode voltage when the voltage of secondary winding 127 is at or above the desired value.

Keying electric valve 107 is normally held non-conducting by applying to its control element 110 an alternating voltage that is 180 degrees out of phase with its anode voltage. This voltage is applied through a control circuit comprising conductor 41, the winding portion between taps 42 and 36 of the secondary 38 of transformer 39, conductor 34, resistor 136, conductor 137, negative self-biasing means 138, and a current limiting resistor 139.

Electric valve 107 is rendered conducting by the closure of a push-button switch 140. When this switch is closed, the control element 110 of electric valve 107 is connected across capacitor 141 of a phase shift circuit including this capacitor and a resistor 142 connected across conductors 41 and 34 to taps 42 and 36 of the secondary 38 of transformer 39. The arrangement is such that with switch 140 closed a voltage leading the anode-cathode voltage of electric valve 107 by slightly less than 180 degrees is applied to the control element of this electric valve to render it conducting during the first few degrees of its positive anode voltage.

Electric valve 107 may be rendered periodically conducting and nonconducting to establish predetermined time-on and time-off periods by means of an initiating electric valve 143 which is connected to become operating when the three-bladed switch 144 is moved from the position illustrated to a position completing circuits through conductors 145, 146 and 147. The circuits completed through conductor 145 connect the anode-cathode circuit of initiating electric valve 143 in parallel with the anode-cathode circuit of turn-on electric valve 98. It also connects the anodes of these electric valves through conductors 145, 146 and 137, negative self-biasing means 138 and resistor 139, to the control element 110 of electric valve 107 so as to cause this electric valve to trail the operation of either electric valves 143 or 98 in the same manner as electric valve 98 operates in trailing fashion depending upon the operation of electric valve 107. Thus, once the initiating electric valve 143 is rendered conducting, keying electric valve 107 will become conducting and thereafter electric valves 98 and 107 will become alternately conducting until finally both electric valves 98 and 100 become conducting when the inductance through 98 becomes zero resulting from the windings 94 and 95 of transformer 70 opposing one another, as has been previously described.

With the three-bladed switch 144 in the off position illustrated, initiating electric valve 143 is held nonconducting by the bias applied to one of its control elements through resistor 148, left blade of switch 144, conductor 149, potentiometer resistor 150 and conductors 151 and 41. Potentiometer resistor 150 is connected in series with another resistor 152 across a source of direct current potential 153. This potential is derived from the alternating current supply circuit 3 through a full-wave rectifier 154 energized from the supply circuit 3 through transformer 51. This rectifier comprises a double anode discharge device 155 having a resistor 156 connected in series with its output circuit 153 and a capacitor 157 connected thereacross in order to stabilize the direct current voltage obtained from the source 3 through the rectifier 154. The voltage across the potentiometer 150, 152 is further stabilized and maintained at a substantially constant value by a voltage regulating valve 158. This valve is connected in series across the direct current source 153 through a voltage absorbing resistor 159. Electric valve 158 may be, as indicated, of the gaseous discharge type which, when conducting, maintains across its terminals a substantially constant voltage for different values of current flow therethrough.

Provision is also made for charging a timing capacitor 160 through a controlled rectifier 161 from the source of supply 153. Capacitor 160 has permanently connected thereacross a discharge circuit 162.

Capacitor 160 is charged from the direct current source 153 whenever electric valve 161 becomes conducting. Its period of conductivity is made dependent upon the conductivity of electric valve 107 by connecting its control element 163 through a current limiting resistor 164, secondary winding 165 of control transformer 113, resistor 159 and conductor 149 to its cathode. The voltage drop across resistor 159 normally applies a negative potential to control element 163 so that electric valve 161 is held nonconducting until this negative bias potential is overcome by the voltage induced in the secondary winding 165 of control transformer 113 in response to current flow through the primary winding 112 of this transformer at the time electric valve 107 is conducting.

Electric valve 143 is provided with two control elements 166 and 167. Control element 166 is connected in the circuit previously described whereby the negative hold-off value of voltage across resistor 150 is applied thereto so long as switch 144 is in its off position as illustrated. When the switch 144 is thrown to its on position, control element 166 is connected through resistor 148 to the negative terminal of capacitor 160 through this capacitor and resistor 152 and conductors 151 and 41 to its cathode. Assuming that capacitor 160 is uncharged, electric valve 143 has applied to its control element 166 the positive voltage across resistor 152 and will conduct when its anode is positive provided a positive control value of voltage is applied to its control element 167. Control element 167 is connected through a conductor 168 to a phase shift circuit comprising a capacitor 169 and a resistor 170, which is like the phase shift circuit previously described for electric valve 107 as comprising capacitor 141 and resistor 142. Consequently, the alternating current control potential applied to control element 167 leads the anode potential of electric valve 140 by something less than 180 degrees so that this valve becomes conducting only at the beginning of a positive half-cycle of its anode voltage.

Capacitor 160 times the off period between periods of conduction determined by capacitor 120 previously described as to function and circuits of which it forms a part. If capacitor 160 is charged, electric valve 143 does not become conducting until its discharge circuit 162 has reduced its voltage to a predetermined value.

Capacitors 171 are connected across the control elements and cathodes of electric valves 13, 14, 40, 54, 98, 100, 107 and 143 to render these valves resistant to faulty operation resulting from transient anode voltages applied thereto. Except for the hot cathode rectifier 122, the heating means and circuit therefor for each of the other electric valves have not been illustrated, in order to simplify the drawing. It is to be understood, however, that the heating filaments are connected with the source of supply 3 through transformers energized from this source in a manner similar to the illustrated arrangement for applying heating current to the filament of rectifier 122 through filament heating transformer 128. It will be noted that with such an arrangement the cathode heating circuits for the several electric valves will be in operation as soon as the line switches 7 are closed to energize the supply circuit 3 from the source of supply 2. Anode-cathode potential will not, however, be applied to these valves until contacts 44 of time delay relay 45 have closed. The operating coil 172 of this relay is connected across the lower winding section 89 of the primary winding of transformer 51. After a predetermined time interval determined by relay 45, this relay will close its contacts 44 thereby connecting the primary 43 of transformer 39 to the supply circuit 3 and thereby applying anode potential to the electric valves connected to the secondary winding of this transformer. If the operator then closes the weld switch 173, operating winding 174 of relay 21 will be energized by being connected across the terminals 42 and 56 of the secondary 38 of transformer 39 through conductors 41 and 59. When this relay closes its contacts 20, the anode-cathode circuits through the firing electric valves 13 and 14 will be completed and the system will be in condition for operation.

A voltage limiting means 175 may also be connected across the primary winding of the welding transformer 6 to protect it from voltage surges. This means has been illustrated as a resistor and may be of the type described and clamed in U. S. Letters Patent 1,822,742, Karl B. McEachron, September 8, 1931.

The features and advantages of the system of Figs. 1a and 1b will be better understood from the following description of its operation.

In order to condition the system for operation, hand switches 7 are closed to connect the supply circuit 3 with the source of alternating current 2. Upon closure of switches 7, the various heating circuits for the hot cathode electric valves will be energized and, after a predetermined time delay, anode potential will be applied to those electric valves having their anode-cathode circuits connected with the secondary winding 38 of transformer 39. Thereafter, when the operator closes the weld switch 173, relay 21 will close its contacts to complete the anode-cathode circuits of electric valves 13 and 14, which are the firing valves for the main electric valves 8 and 9 which are reversely connected in parallel between the load circuit and the supply circuit for supplying alternating current to the load circuit.

The load circuit may be energized at will for single periods of predetermined adjustable length by closing push button 140 or it may be automatically energized intermittently by closing switch 144. The period of energization is determined by timing capacitor 120, and during intermittent operation, the interval between periods of energization is determined by the timing capacitor 160.

Initially, the main or load circuit electric valves 8 and 9, their firing electric valves 13 and 14, relay valves 40 and 54, turn-on electric valve 98, timing electric valve 100 and keying electric valve 107 are all nonconducting.

Relay electric valves 40 and 54 are held non-conducting by the imposition on their control elements 65 of the more negative of the phase shift control voltages of secondaries 75 of transformers 76 or the negative bias voltages of winding sections 71 of the secondary 38 of transformer 39. The more negative of these voltages is selectively and automatically applied to the control elements 65 by means of the unidirectional conducting devices 68, as pointed out in greater detail above.

When the operator closes the push button 140, keying electric valve 107 is rendered conducting at the beginning of a half cycle of its positive anode voltage in response to the voltage of the phase shift circuit 141, 142, which, as previously stated, leads the anode voltage of electric valve 107 by slightly less than 180 degrees. Previous to the closure of switch 140, electric valve 107 was held nonconducting by the out-of-phase voltage applied to its control element by reason of the connection of its control circuit across terminals 42, 36 of the secondary 38 of transformer 39 which supplies a voltage out of phase with the anode voltage applied to this electric valve 107 by reason of its connection across terminals 56, 42 of the secondary 38 of transformer 39.

When electric valve 107 becomes conducting, the trailing voltage drop thereacross renders turn-on electric valve 98 conducting. While electric valve 107 was nonconducting, the voltage across its anode and cathode which is out of phase with the anode-cathode voltage of electric valve 98 was applied to the control element 103 of electric valve 98 and held it nonconducting. When electric valve 98 becomes conducting, it connects the primary winding 94 of transformer 70 across terminals 36 and 42 of the secondary 38 of transformer 39 and thereby energizes the oscillating circuit comprising primary windings 94 and 95 of transformer 70 and the capacitor 96 connected in circuit therewith. As soon as this circuit is set in oscillation, the secondaries 69 of transformer 70 apply control voltages to the control element circuits of electric valves 40 and 54 which overcome the negative bias voltages of the secondary 38 of transformer 39 and permit electric valves 40 and 54 to become conducting at the phase angle determined by the adjustment of the static phase shift circuit across the output terminals 87 and 88 of which the primary windings 83 of control transformers 76 are connected.

When electric valves 40 and 54 become conducting, they abruptly reverse the phase connection of the primaries 32 and 57 of control transformers 26 and 31 with the secondary winding 38 of transformer 39. This produces a corresponding reversal of the phase of the voltage in the secondaries 25 and 30 of these control transformers 26 and 31, which causes electric valves 14 and 13 to become conducting in response to the steep wave front of voltage resulting from the reversal in phase of the voltage. Since this reversal in the phase voltage occurs at the power factor phase angle of the load or at some later time depending on the adjustment of resistors 91 and 92 of the static phase shift circuit, the voltages applied to the control element 17 of electric valves 13 and 14 abruptly change from a negative value of substantial magnitude to a corresponding positive value of the same magnitude. This insures balanced operation of the load circuit electric valves 8 and 9 and their firing electric valves 13 and 14 irrespective of variations in the critical control characteristics of these electric valves and irrespective of any abrupt change in their cathode potentials.

Keying electric valve 107 continues to conduct during its positive half cycles of anode voltage so long as push button 140 is maintained closed, and turn-on electric valve 98 conducts in trailing response to the lagging voltage drop across electric valve 107 until timing electric valve 100 conducts and connects primary winding 95 to transformer 70 across terminals 36, 42 of the secondary 38 of transformer 39. When electric valves 98 and 100 are conducting simultaneously, capacitor 96 is short circuited and the primary windings 94 and 95 of the transformer 70 are connected in parallel with one another for opposing polarity so that the oscillating circuit of which they form a part abruptly stops oscillating and no voltage is induced in the secondary winding 69 of transformer 70. The more negative of the control voltages derived from secondaries 75 of transformers 76 or winding sections 71 of the secondary 38 of transformer 39 thereafter hold electric valves 40 and 54 nonconducting.

Timing electric valve 100 is rendered conducting a full number of half cycles after electric valve 98 was rendered conducting by the timing effect of capacitor 120. This capacitor was charged up through its hot cathode rectifier 122 during the time that electric valve 107 was nonconducting prior to the closure of push button 140. Thereafter when electric valve 107 was conducting while push button 140 was closed, the charge on this capacitor leaked off through its discharge circuit 124 until lagging voltage drop across electric valve 107 was sufficient to render electric valve 100 conducting at the beginning of a positive half cycle of its anode voltage. This operation was insured by the fact that the voltage of the secondary winding 107 of the filament heating transformer was so connected in the charging circuit of capacitor 120 as to oppose the self-generated voltage of the hot cathode rectifier 122 and at the same time insure that the control element connection 131 of capacitor 120 was at a value of voltage positive with respect to the cathode connection of electric valve 100.

After electric valve 100 becomes conducting, the energization period for the load circuit has been terminated and another energization period may be obtained by opening the push-button switch 140 and thereafter closing it again. While the push-button switch 140 is open, capacitor 120 is charged by reason of its connection across the terminals 56 and 42 of the secondary 38 of transformer 39.

For automatic intermittent energization of the load circuit in which each period of energization is accurately timed by capacitor 120 and the interval between energizations is timed by capacitor 160, the operator closes the switch 144 from the off position illustrated to the position in which circuits are completed through conductors 145, 146 and 147.

If electric valve 107 has not previously been conducting, capacitor 160 is not charged and consequently the completion of the circuit through conductor 147 applies a positive control voltage to the control element 166 of initiating electric valve 143. This electric valve will not become conducting, however, until a positive control voltage is also applied to its second control element 167 by reason of its connection 168 with the phase shift circuit 169, 170. This phase shift circuit, as the previously described circuit 141, 142 for electric valve 147, applies a positive control voltage to control element 167 of electric valve 143 only during the first few degrees of a positive half cycle of voltage applied to the anode of electric valve 143.

It will be noted that the anode-cathode circuit of electric valve 143 is connected in parallel with the anode-cathode circuit of electric valve 98 through conductors 145 and 41. Consequently, when electric valve 143 becomes conducting it energizes the primary winding 94 of transformer 70 and initiates the period during which the load is energized for the reasons above given in connection with the operation above described as resulting from the closure of push button 140.

It will be noted that the anodes of electric valves 143 and 98 are connected through conductors 145 and 146 to the control element 110 of electric valve 107 so that this electric valve 107 will become conducting in trailing response to the lagging voltage drop across either of electric valves 143 or 98. Consequently, when electric valve 143 became conducting, electric valve 107 became conducting and thereafter electric valves 98 and 107 became alternately conducting until the flow of lagging current through electric valve 98 disappears at the time electric valve 100 becomes conducting and reduces to zero or a very low value the inductance of the circuit through electric valve 98.

Once electric valve 107 became conducting, control potential was applied to control element 163 of rectifier 161 through control transformer 113 which rendered this rectifier conducting and initiating electric valve 143 nonconducting. So long as electric valve 107 is conducting, capacitor 160 is charged by the current flow through rectifier 161 until it obtains a charge depending on the voltage across the voltage regulating valve 158. Thereafter when electric valve 107 becomes nonconducting due to the break in the trailing response of this electric valve to electric valve 98, capacitor 160 discharges through its discharge circuit 162, and after a predetermined interval of time determined by its discharge rate, electric valve 143 again becomes conducting to initiate another period of energization of the load circuit.

It is thus apparent that with the control system illustrated, independent energizations of the load circuit may be had at the will of the operator by closing push button 140 and maintaining it closed until the end of an energization period, or that automatic repeated energizations of the load circuit with full electronic timing of the periods on and off may be had by closing switch 144. In either case, the arrangement is such that full cycles of welding current are supplied to the load circuit and the amount of load current may be adjusted by an adjustment of a phase shift circuit which controls the point in the half cycle of voltage at which the electric valves become conducting.

Gaseous electric valves, such as the timing electric valve 100, have a small negative grid current flow characteristic. Consequently, the connection of the timing capacitor 120 across the circuit completed between the cathode and grid of such an electric valve will furnish an additional discharge circuit for the capacitor which will make it necessary to adjust the discharge circuit 124 of the capacitor unequal amounts for integral multiples of the discharge periods of the capacitor. It is desirable to have equal adjustments of the resistor in discharge circuit 124 produce equal timing periods, and this may be accomplished by using the modification shown in Fig. 2 of the drawings.

In Fig. 2 of the drawings, the same portions of the circuit shown in Fig. 1a have been identified by the same reference numerals. It will be noted, however, that the control element 103 of electric valve 100 is connected with terminal 131 of capacitor 120 through a cathode follower circuit including electric valve 176 and cathode follower resistor 177, which are connected in circuit with one another, and conductors 178 and 179 across conductors 82 and 79, which in turn are connected to terminals 72 and 73 of the secondary 38 of transformer 39. Electric valve 176 is of the vacuum type and has no sensible negative grid current flow. Its grid or control element 180 is connected through a current limiting resistor 181 to terminal 131 of capacitor 120, and its cathode 182 is connected through current limiting resistor 119 to control element 103 of the electric valve 100 which, as indicated, is of the gas type and has a negative grid current flow characteristic. With such an arrangement, discharge of capacitor 120 except through its discharge circuit is effectively prohibited and equal adjustments of the adjustable resistor in the discharge circuit 124 will produce equal timing intervals for capacitor 120.

It is, of course, apparent that my invention is not limited in its application to the use of electric valves of the immersion igniter type, such as illustrated by way of example. Other types of electric valves may be employed for transmitting the load current from the supply circuit to the load circuit. In each case the arrangement provided for supplying a steep wave front of control voltage in order to insure balanced firing of the load circuit valves may be used with the desirable advantages characteristic of the system above described. It is also apparent that where it is necessary only to supply to the load circuit a half cycle or less of supply circuit current, a single electric valve may be used and the uniformity of its current conduction periods resulting from the steep wave front of voltage applied thereto will be of great advantage in obtaining uniform time intervals of current flow irrespective of variations in the critical control characteristics of the electric valve resulting from structural variations therein or by reason of its particular connection in the load circuit producing transient cathode potentials which interfere with such accurate timing.

Therefore, while I have shown and described a particular embodiment of my invention and a variation thereof, it will be obvious to those skilled in the art that the above changes, as well as many others, may be made without departing from my invention in its broader aspects, and I therefore aim in the appended claims to cover all such changes and modifications as fall within the true spirit and scope of my invention.

What I claim as new and desire to secure by Letters Patent of the United States is:

1. Apparatus comprising an alternating current supply circuit, two electric valves each of which has an anode, a cathode, and a control element, a direct connection between the cathodes of said electric valves, means for connecting the anode-cathode circuits of said electric valves for energization from said supply circuit with the anode voltage of one of said electric valves at a voltage of said supply circuit which is of one polarity when the anode voltage of the other of said electric valves is at a voltage of said supply circuit which is of the opposite polarity so that one of said electric valves may conduct during half cycles of voltage of one polarity and the other of said valves may conduct during half cycles of voltage of the opposite polarity, said means providing inductive circuits through the anode-cathode circuits of each of said electric valves, means for introducing into the control element circuit of one of said electric valves a voltage rendering said one of said electric valves conducting, and means for connecting each of said electric valves for operation in trailing response to the other of said electric valves, said means including for each of said electric valves control element circuits which are completed through the anode-cathode circuit of the other of said electric valves and which apply to the control element of each of said electric valves the trailing voltage drop across the anode and cathode of the other of said electric valves resulting from conduction through said other electric valve continuing over into its negative half cycle of anode voltage which corresponds to the positive half cycle of anode voltage of the electric valve next operating in trailing sequence.

2. Apparatus comprising an alternating current supply circuit, two electric valves each of which has an anode, a cathode, a control element, and a control element circuit, a direct connection between the cathodes of said electric valves, means for connecting the anode-cathode circuits of said electric valves for energization from said supply circuit with the anode voltage of one of said electric valves at a voltage of said supply circuit which is of one polarity when the anode voltage of the other of said electric valves is at a voltage of said supply circuit which is of the opposite polarity so that one of said electric valves may conduct during half cycles of voltage of one polarity and the other of said valves may conduct during half cycles of voltage of the opposite polarity, said means providing an inductive circuit through the anode-cathode connection of each of said electric valves with said supply circuit, means for connecting the control element circuits of each of said electric valves in circuit with the trailing voltage drop appearing across the other of said electric valves as a result of current flow through each of said electric valves continuing over into its negative half cycle of its anode voltage which corresponds to the positive half cycle of anode voltage of the other of said electric valves and thereby causing said electric valves to conduct alternately in trailing response to one another, and means for introducing into the control element circuit of one of said electric valves a voltage rendering said one of said valves initially conductive.

3. Apparatus comprising two electric valves each of which has an anode, a cathode, and a control element, a direct connection between the cathodes of said electric valves, an alternating current supply circuit, means for connecting the anode-cathode circuits of said electric valves for energization from said supply circuit with the anode voltage of one of said electric valves at a voltage of said supply circuit which is of one polarity when the anode voltage of the other of said electric valves is at a voltage of said supply circuit which is of the opposite polarity so that one of said electric valves may conduct during half cycles of voltage of one polarity and the other of said valves may conduct during half cycles of voltage of the opposite polarity, said means providing an inductive circuit through the anode-cathode connection of each of said electric valves with said supply circuit, means for connecting the control elements of each of said electric valves to be responsive to the voltage of said supply circuit appearing across the anode and cathode of the other of said electric valves, and means for initiating conduction for one said electric valve and thereby the alternate conduction of both of said electric valves in response to the trailing voltage drop appearing across each of said electric valves as a result of the lagging current flow therethrough.

4. Apparatus comprising two electric valves each of which has an anode, a cathode, and a control element, a direct connection between the cathodes of said electric valves, an alternating current supply circuit, means for connecting the anode-cathode circuits of said electric valves for energization from said supply circuit with the anode voltage of one of said electric valves at a voltage of said supply circuit which is of one polarity when the anode voltage of the other of said electric valves is at a voltage of said supply circuit which is of the opposite polarity so that one of said electric valves may conduct during half cycles of voltage of one polarity and the other of said valves may conduct during half cycles of voltage of the opposite polarity, said means providing an inductive circuit through the anode-cathode connection of each of said electric valves with said supply circuit, means for connecting the control elements of each of said electric valves to be responsive to the voltage of said supply circuit appearing across the anode and cathode of the other of said electric valves, means for initiating conduction of one said electric valve and thereby the alternate conduction of both of said electric valves in response to the trailing voltage drop appearing across each of said electric valves as a result of the lagging current flow therethrough, and means for interrupting the trailing operation of said pair of electric valves.

5. Apparatus comprising two electric valves each of which has an anode, a cathode, and a control element, a direct connection between the cathodes of said electric valves, an alternating current supply circuit, means for supplying connecting the anode-cathode circuits of said electric valves for energization from said supply circuit with the anode voltage of one of said electric valves at a voltage of said supply circuit which is of one polarity when the anode voltage of the other of said electric valves is at a voltage of said supply circuit which is of the opposite polarity so that one of said electric valves may conduct during half cycles of voltage of one polarity and the other of said electric valves may conduct during half cycles of voltage of the opposite polarity, said means providing an inductive circuit through the anode-cathode connection of each of said electric valves with said supply circuit, means for connecting the control elements of each of said electric valves to be responsive to the voltage of said supply circuit appearing across the anode and cathode of the other of said electric valves, means for initiating conduction of one said electric valve and thereby the alternate conduction of both of said electric valves in response to the trailing voltage drop appearing across each of said electric valves as a result of the lagging current flow therethrough, and means for eliminating the lagging current flow through one of said electric valves and thereby interrupting the trailing operation of said pair of electric valves.

6. Apparatus comprising an alternating current supply circuit, a pair of electric valves each of which has an anode, a cathode, and a control element, means connecting the cathodes of said electric valves to the same potential of said alternating current supply circuit and the anodes of said electric valves to potentials of said supply circuit such that one of said electric valves may conduct during half cycles of voltage of one polarity and the other of said electric valves may conduct during half cycles of voltage of the opposite polarity, said means providing an inductive circuit through each of said pair of electric valves so that the current flow therethrough lags its positive anode voltage, means for connecting the control elements of each of said electric valves in circuit with the trailing voltage drop across the anode-cathode circuit of the other of said electric valves so that each of said pair of electric valves conducts in trailing response to the other, a third electric valve having an anode, a cathode and a control element and having its anode-cathode circuit connected in parallel with the anode-cathode circuit of one of said pair of electric valves for establishing conduction through said inductive circuit of said one electric valve in the same direction as said one electric valve, means for applying a control potential to the control element of said third electric valve to render it conductive and thereby initiating operation of said pair of electric valves which thereafter become conductive alternatively each in trailing response to the other, and timing means initiated in response to the initiation of conduction through one of said pair of electric valves and effective after a predetermined time delay for interrupting the trailing operation of said pair of electric valves.

7. Apparatus comprising an alternating current supply circuit, a pair of electric valves each of which has an anode, a cathode, and a control element, means connecting the cathodes of said electric valves to the same potential of said alternating current supply circuit and the anodes of said electric valves to potentials of said supply circuit such that one of said electric valves may conduct during half cycles of voltage of one polarity and the other of said electric valves may conduct during half cycles of voltage of the opposite polarity, said means providing an inductive circuit through each of said pair of electric valves so that the current flow therethrough lags its positive anode voltage, means for connecting the control elements of each of said electric valves in circuit with the trailing voltage drop across the anode-cathode circuit of the other of said electric valves so that each of said pair of electric valves conducts in trailing response to the other, a third electric valve having an anode, a cathode, and a control element and having its anode-cathode circuit connected in parallel with the anode-cathode circuit of one of said pair of electric valves for establishing conduction through said inductive circuit of said one electric valve in the same direction as said one electric valve, means for applying a control potential to the control element of said third electric valve to render it conductive and thereby initiating operation of said pair of electric valves which thereafter become conductive alternatively each in trailing response to the other, and timing means initiated in response to the initiation of conduction through one of said pair of electric valves and effective after a predetermined time delay for eliminating the lagging current through one of said pair of electric valves and thereby breaking the alternate sequential operation of said pair of electric valves in trailing response to one another.

8. Apparatus comprising an alternating current supply circuit, a pair of electric valves each of which has an anode, a cathode, and a control element, means connecting the cathodes of said electric valves to the same potential of said alternating current supply circuit and the anodes of said electric valves to potentials of said supply circuit such that one of said electric valves may conduct during half cycles of voltage of one polarity and the other of said electric valves may conduct during half cycles of voltage of the opposite polarity, said means providing an inductive circuit through each of said pair of electric valves so that the current flow therethrough lags its positive anode voltage, means for connecting the control elements of each of said electric valves in circuit with the trailing voltage drop across the anode-cathode circuit of the other of said electric valves so that each of said pair of electric valves conducts in trailing response to the other, a third electric valve having an anode, a cathode, and a control element and having its anode-cathode circuit connected in parallel with the anode-cathode circuit of one of said pair of electric valves for establishing conduction through said inductive circuit of said one electric valve in the same direction as said one electric valve, means for applying a control potential to the control element of said third electric valve to render it conductive and thereby initiating operation of said pair of electric valves which thereafter become conductive alternatively each in trailing response to the other, and timing means initiated in response to the initiation of conduction through one of said pair of electric valves and effective after a predetermined time delay for connecting one of said electric valves with said supply circuit through a noninductive circuit and thereby eliminating the trailing voltage drop due to current flow through said one of said electric valves.

9. Apparatus comprising an alternating current supply circuit, a pair of electric valves each of which has an anode, a cathode, and a control element, means connecting the cathodes of said electric valves to the same potential of said supply circuit and the anodes of said electric valves to potentials of said supply circuits such that one of said electric valves may conduct during half cycles of voltage of one polarity and the other of said electric valves may conduct during half cycles of voltage of the opposite polarity, said means comprising an inductive circuit through each of said pair of electric valves whereby lagging current flows through the anode-cathode circuits of said electric valves, means for connecting the control elements of each of said electric valves in circuit with the trailing voltage drop across the anode-cathode circuit of the other of said electric valves so that said pair of electric valves conduct alternately in trailing response to one another, means including a capacitor for timing the operating period of said pair of electric valves, means including a second capacitor for timing the non-operating period of said pair of electric valves, charging and discharging circuits for each of said capacitors, means responsive to the conductivity of one of said pairs of electric valves for initiating the discharging of said first mentioned capacitor and the charging of said second capacitor and responsive to the non-conductivity of said one of said pairs of electric valves for initiating the charging of said first mentioned capacitor and the discharging of said second capacitor, means for initiating conduction of one of said pairs of electric valves, means responsive to the discharging of said first mentioned capacitor to a predetermined value for interrupting the trailing operation of said pair of electric valves, and means responsive to the discharge of said second capacitor for again initiating the operation of said pair of electric valves.

10. Apparatus comprising an alternating current supply circuit, a control transformer having primary and secondary windings, an electric valve for connecting the primary winding of said transformer for energization from said alternating current supply circuit, said electric valve having an anode, a cathode and a control element, means for applying control potentials to the control element of said electric valve to render it conducting and after a predetermined time delay non-conducting, a capacitor, a discharge circuit continually effective for discharging said capacitor at a predetermined rate, direct current supply conductors, means including a second electric valve for connecting said capacitor in a charging circuit across said direct current supply conductors, said second electric valve having an anode, a cathode and a control element, means for rendering said second electric valve conducting in response to the conductivity of said first mentioned electric valve, said means including a control element circuit for said second electric valve having connected therein the secondary winding of said control transformer, and means responsive to the voltage of said capacitor for again rendering said first mentioned electric valve conducting after a predetermined delay depending on the discharge rate of said capacitor.

11. Apparatus comprising an alternating current supply circuit, a control transformer having primary and secondary windings, a pair of electric valves, one of which has an anode, a cathode and a control element, and the other of which has an anode, a cathode and a pair of control elements, means for supplying alternating voltages of said supply circuit to said electric valves so that one of said electric valves may conduct during half cycles of voltage of one polarity and the other of said valves may conduct during half cycles of voltage of the opposite polarity, said means providing an inductive circuit through the anode-cathode connection of each of said electric valves with said alternating voltage and the inductive circuit through said one of said electric valves including the primary winding of said control transformer, means for connecting the control element of said one of said electric valves to be responsive to the voltage of said supply circuit appearing across the anode and cathode of said other electric valve and for connecting one of the control elements of said other electric valve to a potential of said supply circuit that renders said electric valve conducting during a positive half cycle of the anode voltage of said other electric valve providing the potential applied to its second control element will permit said second electric valve to become conducting, direct current supply conductors, a capacitor, means including a third electric valve for charging said capacitor from said direct current supply conductors, said electric valve having an anode, a cathode and a control element, means continually effective for discharging said capacitor at a predetermined rate, a potentiometer having a mid-tap and having its outside terminals connected across said direct current supply conductors, means for connecting the cathode of said other electric valve to said mid-tap of said potentiometer, means for selectively connecting the second control element of said other electric valve to the negative terminal of said capacitor or the negative conductor of said direct current supply conductors, means for applying a negative bias potential to the control element of said third electric valve, means responsive to the current flow through the anode-cathode circuit of said one electric valve for applying a control potential to the control element of said third electric valve which overcomes said bias potential and renders said third electric valve conducting, and means for maintaining said one electric valve conducting for a predetermined period of time, after which said valve becomes non-conducting until said capacitor discharges to a voltage which again renders said other electric valve conducting and said one electric valve again conducting in trailing response to the conduction of said other electric valve.

12. Apparatus comprising an alternating current supply circuit, a pair of electric valves each of which has an anode, a cathode, and a control element, means connecting the cathodes of said electric valves to the same potential of said supply circuit and the anodes of said electric valves to potentials of said supply circuits such that one of said electric valves may conduct during half cycles of voltage of one polarity and the other of said electric valves may conduct during half cycles of voltage of the opposite polarity, said means comprising an inductive circuit through each of said pair of electric valves whereby lagging current flows through the anode-cathode circuits of said electric valves, means for connecting the control elements of each of said electric valves in circuit with the trailing voltage drop across the anode-cathode circuit of the other of said electric valves so that said pair of electric valves conduct alternately in trailing response to one another, means including a capacitor for timing the operating period of said pair of electric valves, means including a second capacitor for timing the non-operating period of said pair of electric valves, charging and discharging circuits for each of said capacitors, means responsive to the conductivity of one of said pairs of electric valves for initiating the discharging of said first mentioned capacitor and the charging of said second capacitor and responsive to the non-conductivity of said one of said pairs of electric valves for initiating the charging of said first mentioned capacitor and the discharging of said second capacitor, means including a third electric valve for initiating conductivity of said one of said pair of electric valves, said third electric valve having an anode, a cathode and a pair of control elements, means connected in the anode-cathode circuit of said third electric valve in parallel with the anode-cathode circuit of said other of said pairs of electric valves for conduction of current in the same direction through said inductive circuit of said other of said pair of electric valves, means for connecting one of said control elements of said third electric valve to said second capacitor and the other of said control elements to a source of potential rendering said third electric valve conducting at the beginning of a half cycle of its positive anode voltage provided the potential of said second capacitor has decreased sufficiently to permit conduction of said third electric valve, a fourth electric valve having an anode, a cathode, and a control element, circuit means completed through anode-cathode circuit of said fourth electric valve for rendering non-conductive said one of said pair of electric valves, and means for connecting the control element of said fourth electric valve through said first mentioned capacitor to render said fourth electric valve conducting when the potential of said capacitor has decreased to a predetermined value.

13. Apparatus comprising two electric valves each of which has an anode, a cathode, and a control element, a direct connection between the cathodes of said electric valves, means for supplying alternating voltage to said electric valves so that one of said electric valves may conduct during half cycles of voltage of one polarity and the other of said electric valves may conduct during half cycles of voltage of the opposite polarity, said means providing an inductive circuit through one of said electric valves, means for introducing into the control element circuit of said one of said electric valves voltages rendering said one of said electric valves conducting and non-conducting when its anode voltage is positive, means including a timing capacitor for connecting the control element of said other of said electric valves to the anode connection of said one of said electric valves in its said inductive circuit, means including an adjustable resistance for controlling the discharge rate of said capacitor, and means for charging said capacitor comprising a hot cathode rectifier connected in circuit with said capacitor across the electrodes of a voltage-regulating valve having one of its electrodes connected through a voltage-absorbing resistor to the anode connection of said one of said electric valves in its said inductive circuit and its other electrode connected to the common cathode connection of said electric valves through a source of voltage opposing the self-generated voltage of said hot cathode rectifier and establishing the voltage of that terminal of said capacitor connected to the control element of said other of said electric valves at a level higher than that of the common cathode connection of said electric valves.

14. Apparatus comprising an alternating current supply circuit, a load circuit, electric trans-lating apparatus interconnecting said circuits and including an electric valve means having a control member, means including a first electric valve which when conductive applies to the control member of said electric valve means a component of voltage rendering said valve means conductive, said electric valve having an anode, a cathode, and a control element, means including a second electric valve which when conductive supplies to the control member of said electric valve means a component of voltage rendering said electric valve means non-conductive, said electric valve having an anode, a cathode, and a control element, a third electric valve having an anode, a cathode, and a control element, a direct connection between the cathodes of said first, second and third electric valves, means for connecting the anode-cathode circuits of said first and second electric valves with said supply circuit for conduction during half cycles of voltage thereof of one polarity and the anode-cathode circuit of said third electric valve in an inductive circuit with said supply circuit for conduction during half cycles of voltage thereof of the opposite polarity, means connecting the control element of said first electric valve to the anode connection of said third electric valve in its said inductive circuit for rendering said first electric valve conductive in response to the voltage drop across said third electric valve and in trailing fashion dependent on conduction of said third electric valve, means including a timing capacitor for connecting the control element of said second electric valve to the anode connection of said third electric valve in its said inductive circuit, adjustable means connected across said capacitor for controlling the discharge rate of said capacitor, means for charging said capacitor comprising a hot cathode rectifier connected in circuit with said capacitor across a voltage-regulating valve having one of its electrodes connected through a voltage absorbing resistor to the anode connection of said third electric valve in its said inductive circuit and its other electrode connected to the common cathode connection of said first, second, and third electric valves in circuit with a voltage opposing the self-generated voltage of said hot cathode rectifier and establishing the voltage level of the control element connection of said second electric valve with said capacitor at a value more positive than the cathode connection of said second electric valve.

15. Apparatus comprising an alternating current supply circuit, a circuit connected for energization from said supply circuit through the anode-cathode circuit of an electrical valve having a control element and a control element circuit, means including a timing capacitor connection in the control element circuit in said electrical valve, an adjustable discharge circuit for said capacitor, means including a hot cathode rectifier for charging said capacitor from said supply circuit and a source of voltage connected in series with said rectifier in said charging circuit for said capacitor for opposing the self-generation voltage of said rectifier and for establishing the voltage of the control element connection of said electric valve with said capacitor at a value more positive than the cathode connection of said electric valve.

16. Apparatus comprising an alternating current supply circuit, a circuit connected for energization from said supply circuit through the anode-cathode circuit of an electrical valve having a control element and a control element circuit, means including a timing capacitor connection in the control element circuit in said electrical valve, an adjustable discharge circuit for said capacitor, a voltage regulating valve connected for energization from said supply circuit, means including a hot cathode rectifier connected in series with said capacitor across said voltage regulating valve for charging said capacitor to a predetermined voltage, said rectifier having a cathode heater filament, a filament heating transformer having primary and secondary windings, means for connecting said secondary winding of said transformer between said cathode of said electric valve and said cathode of said rectifier and in circuit with the filament of said rectifier and means connecting the primary winding of said transformer with said supply circuit for applying a voltage to the cathode of said rectifier that is positive relative to the cathode voltage of said electric valve and of a value sufficient to oppose the self-generating voltage of said rectifier.

17. Apparatus comprising an alternating current supply circuit, a circuit connected for energization from said supply circuit through the anode-cathode circuit of an electrical valve having a control element and a control element circuit, means including a timing capacitor connection in the control element circuit in said electrical valve, an adjustable discharge circuit for said capacitor, a voltage regulating valve connected for energization from said supply circuit, means including a hot cathode rectifier connected in series with said capacitor across said voltage regulating valve for charging said capacitor to a predetermined voltage, said rectifier having an anode, a cathode, and a control element, a cathode heater filament and a control element, a filament heating transformer having primary and secondary windings, means for connecting said secondary winding of said transformer between said cathode of said electric valve and said cathode of said rectifier and in circuit with the filament of said rectifier, means connecting the primary winding of said transformer with said supply circuit for applying a voltage to the cathode of said rectifier that is positive relative to the cathode voltage of said electric valve and of a value sufficient to oppose the self-generating voltage of said rectifier, and means for applying control potentials to the control element of said rectifier that render said rectifier conductive only during a preselected midportion of the positive anode potential of said rectifier.

18. Apparatus comprising an alternating current supply circuit, a load circuit, electric translating apparatus interconnecting said circuits and including an electric valve having an anode, a cathode and a control element, a control element circuit for said electric valve, three terminals connected with said supply circuit so that two of said terminals are of opposite polarity relative to one another and to the third of said terminals, a control transformer having primary and secondary windings, means for connecting said primary winding of said control transformer in the control element circuit of said electric valve, means for connecting one terminal of the primary winding of said control transformer to said third terminal of said supply circuit and its other terminal to a switching circuit having two branches each of which is connected to a different one of said other terminals of said supply circuit, a current limiting element connected in one of said branch circuits, a second electric valve having an anode, a cathode and a control element and having its anode connected toward said other terminal of said primary winding of said control transformer, and means for applying control potentials to the control element of said second electric valve to render said valve conducting and non-conducting and for reversing thereby the phase of the control voltage applied to the control element of said first mentioned electric valve.

19. Apparatus comprising an alternating current supply circuit, a load circuit, electric translating apparatus interconnecting said circuits and including an electric valve having an anode, a cathode and a control element, a second electric valve having an anode, a cathode and a control element, means including said second electric valve for applying an alternating potential of said supply circuit to the control element of said first mentioned electric valve and for reversing the phase of said potential each time said second electric valve becomes conducting or non-conducting, initiating, keying, turn on, and timing electric valves, the sequential operation of which supplies control potentials to the control element of said second electric element to render said second electric valve conducting or non-conducting, each of said electric valves having an anode, a cathode and a control element and having its anode-cathode circuit connected with said supply circuit, means including said initiating valve for applying to the control element of said keying electric valve a control potential rendering said keying electric valve conducting, means for applying to the control elements of said keying electric valve and said turn on electric valve control potentials for rendering said electric valves conducting alternately each in response to the conduction of the other, timing means becoming effective upon the initiation of conduction through said keying electric valve for rendering said timing electric valve conducting after a predetermined timing delay, means responsive to the simultaneous conduction of said turn on electric valve and said timing electric valve for rendering said keying electric valve non-conducting, and means including said initiating electric valve for again rendering said keying electric valve conducting after a predetermined timing delay.

20. Apparatus comprising an alternating current supply circuit, a load circuit, electric translating apparatus interconnecting said circuits and including an electric valve having an anode, a cathode and a control element, a control element circuit for said electric valve, three terminals connected with said supply circuit so that two of said terminals are of opposite polarity relative to one another and to the third of said terminals, a control transformer having primary and secondary windings, means for connecting said primary winding of said control transformer in the control element circuit of said electric valve, means for connecting one terminal of the primary winding of said control transformer to said third terminal of said supply circuit and its other terminal to a switching circuit having two branches each of which is connected to a different one of said other terminals of said supply circuit, a current limiting element connected in one of said branch circuits, a second electric valve having an anode, a cathode and a control element and having its anode connected toward said other terminal of said primary winding of said control transformer, initiating, keying, turn on, and timing electric valves each of which has an anode, a cathode and a control element, each of which has its anode-cathode circuit connected with said supply circuit and the sequential operation of which applies control potentials to the control element of said second electric valve to render said second valve conducting and non-conducting and thereby reverse the phase of the control voltage applied to the control element of said first mentioned electric valve, means including said initiating valve for applying to the control element of said keying electric valve a control potential rendering said keying electric valve conducting, means for applying to the control elements of said keying electric valve and said turn on electric valve control potentials for rendering said electric valves conducting alternately each in response to the conduction of the other, timing means becoming effective upon the initiation of conduction through said keying electric valve for rendering said timing electric valve conducting after a predetermined timing delay, means responsive to the simultaneous conduction of said turn on electric valve and said timing electric valve for rendering said keying electric valve non-conducting, and means including said initiating electric valve for again rendering said keying electric valve conducting after a predetermined timing delay.

MAURICE E. BIVENS.

No references cited.